Patented Apr. 17, 1945

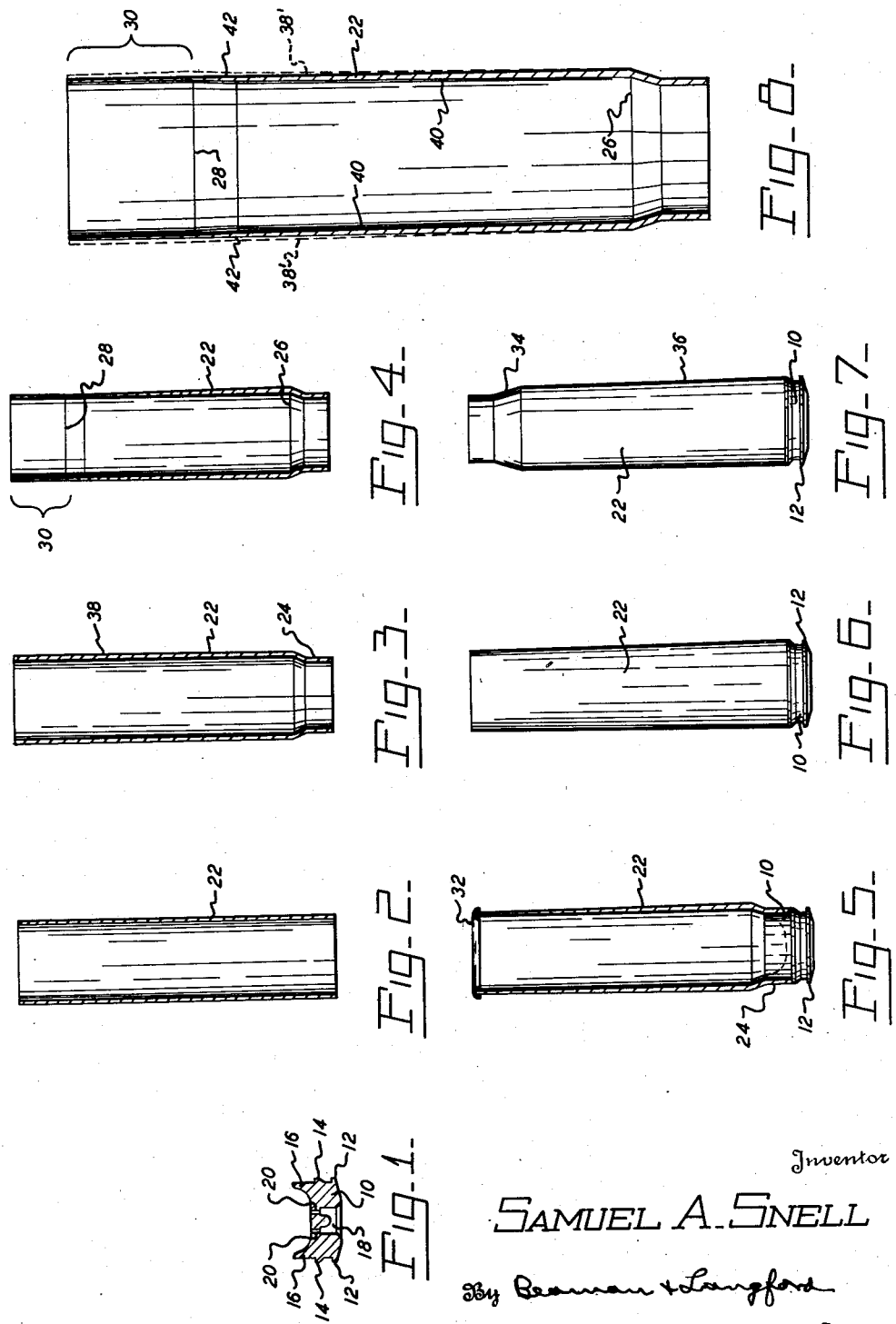

2,373,921

UNITED STATES PATENT OFFICE 2,373,921

STEEL CARTRIDGE CASE

Samuel A. Snell, Jackson, Mich., assignor, by mesne assignments, to Ryerson & Haynes, Inc., Jackson, Mich., a corporation of Michigan Application September 25, 1941, Serial No. 412,251

1 Claim. (Cl. 29—1.3)

The present invention relates to improvements in steel cartridge cases and method of making the same.

Cartridge cases have heretofore been drawn from sheet brass. While I am informed that attempts have been made to fabricate cartridge cases from steel, the resulting products have not been successful in use.

According to the present invention an improved steel cartridge case is provided which may be produced at a fraction of the cost of a brass cartridge case. This is possible due to the lower cost of steel as compared with brass, and the fact that the improved method of making herein disclosed reduces scrap and eliminates heat treatment, at least to a major extent. The number of operations required to make my improved steel cartridge case is approximately one third that required in the present accepted methods of making brass cartridge cases, and the cost of fabricating equipment to produce the same is proportionately reduced. Because of the simplicity of the method of manufacture, the likelihood of interruptions in production are reduced to a minimum as is the presence of hidden defects and imperfections in the resulting product.

In general my improved cartridge case and method of making the same involves the fabrication of a steel cartridge case from the preformed tube and head part welded together with the tube work hardened during the shaping of the tube into the finished cartridge case. The welding of the head part and tube is preferably carried out in a furnace in the presence of a nonoxidizing gas with copper or brass acting as the bonding agent. This bonding agent may be present through electroplating of the parts to be welded, it may be flowed into the weld, or as hereinafter disclosed, the parts may be both electroplated with a bonding agent and additional bonding agent supplied at the time of welding to assure the presence of adequate bonding agent, and complete rust-proofing of the cartridge case.

In the drawing

Fig. 1 is a vertical cross section of the head part,

Fig. 2 is a vertical cross section of the tube part,

Fig. 3 is a view similar to Fig. 2 of the tube following the necking operation,

Fig. 4 is a view similar to Fig. 3 following the tapering operation,

Fig. 5 shows the head part of Fig. 1 assembled in the tube part of Fig. 4,

Fig. 6 shows the head part and tube assembled in Fig. 5 after the drawing and sizing operation, Fig. 7 shows the assembly of Fig. 6 after the necking and tapering operations, and Fig. 8 is an enlargement of Fig. 4 showing one manner in which the parallel inner and outer wall structures of a tube may be tapered.

Referring to the drawing, in Fig. 1 the head part 10 is shown in vertical cross section. Preferably the head part 10 is formed upon a screw machine out of steel bar stock to its finished dimensions. As shown, the part 10 comprises an ejecting flange 12, a tube flange 14 and a cylindrical portion 16. The percussion cap chamber is indicated at 18, into which vents 20 open.

Fig. 2 shows a steel tube 22 cut to the desired length. In practice, the tube may be made from cold-rolled steel strip, rolled into a tube, and electrically welded. The tube 22 is slightly oversize with respect to the diameter of the finished cartridge case so as to provide for the tapering and work hardening operations as will be hereinafter described. In Fig. 3 the tube 22 is necked at 24 in a suitable die to provide an inside diameter corresponding to the outside diameter of the cylindrical portion 16 of the head part 10.

In Fig. 4 the tube 22 is shown with the walls thereof tapered from a point 26 to the point 28, with the bracketed portion 30 having parallel inner and outer walls; the bracketed length 30 of the tube being that portion in which the projectile is crimped in the finished cartridge.

As shown in Fig. 5, the head part 10 has been tightly fitted to the necked portion 24 of the tube 22. The assembly of Fig. 5 is then placed in a furnace with a welding ring 32 supported on the upper end of the tube 22. Preferably the ring 32 is of copper with the assembly being heated up in the furnace in an atmosphere of nonoxidizing gas such as hydrogen. The temperature of the furnace is sufficient to melt the copper which freely flows throughout the entire length of the assembly, rust-proofing the inner and outer surfaces of the tube 22 and the head part 10, and effecting a strong weld between the section 24 of the tube 22 and the cylindrical portion 16 of the head part 10. This type of welding is well known and need not be elaborated upon.

Following the welding operation, the assembly of Fig. 5 is placed in a suitable die and the tube 22 drawn and sized to the cylindrical form shown in Fig. 6. This results in a work hardening of the tube which, together with the work hardening produced by the necking of the upper end 34 of the tube and tapering of the remaining portion 36 of the tube as shown in Fig. 7, imparts the necessary resiliency to the cartridge case.

It will be appreciated that the tube 22 of the assembly of Fig. 5 will be annealed in the welding furnace. Accordingly, the resulting cartridge case of Fig. 7 would not have adequate resiliency to withstand firing stresses were it not for the work hardening of the drawing, sizing, necking and tapering operations of Figs. 6 and 7.

One satisfactory method of obtaining the desired wall thickness and tapers on the tube 22 is illustrated on an enlarged scale in Fig. 8. As illustrated in Fig. 8, the cylindrical portion 38 of the tube 22 of Fig. 3 is shown expanded by a suitable tapering punch to the outer dotted outline 38' and the inner full line 40. A centerless grinder is then employed to remove the material between the dotted outline 38' and the outer full line 42. Upon the completion of the grinding operation the outside of the tube 22 is again cylindrical in shape, but the inside wall tapers from 26 to 28, and it is parallel to the outside wall in the bracketed area 30. Obviously other methods may be employed for tapering the wall of the tube 22 such as turning, rolling, swaging, etc. When the tube 22 of the assembly of Fig. 7 is tapered so as to fit the gun chamber, the inside taper of Fig. 4 as explained in detail in Fig. 8 will be reduced.

In practice, the head part 10 is preferably copper plated following machining to finished dimensions, with the tube 22 being copper plated prior to the assembly of Fig. 5. Also it may be found desirable to locally anneal the upper end of the tube 22 prior to the necking operation at 34.

By varying the amount of oversize of the tube 22 of Fig. 2, or increasing or decreasing the sizes of the punches to vary the ironing action in the dies, the desired tempering from work hardening may be controlled.

Having thus described my invention, what I desire to secure by Letters Patent and claim is:

A method of producing steel cartridge cases comprising the steps of reducing the diameter of a tube at one end, and expanding the remainder of the tube to a generally conical shape, forming the outside of the tube to a cylindrical shape while retaining the conical shape internally, thereby tapering the tube wall, securing a head to the tube, drawing the head and tube assembly to harden the metal in the tube, and forming the assembly to conform with the gun chamber.

SAMUEL A. SNELL.